US012604809B2

(12) United States Patent
Smith et al.

(10) Patent No.: US 12,604,809 B2
(45) Date of Patent: Apr. 21, 2026

(54) AGRICULTURAL SYSTEM FOR SENSING PLANT MATERIAL

(71) Applicant: CNH Industrial America LLC, New Holland, PA (US)

(72) Inventors: Kevin Smith, Narvon, PA (US); Stefaan Desmet, Drongen (BE); Andrew Harmon, Sheboygan, WI (US); Jeffrey Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 790 days.

(21) Appl. No.: 17/946,614

(22) Filed: Sep. 16, 2022

(65) Prior Publication Data

US 2024/0090381 A1 Mar. 21, 2024

(51) Int. Cl.
*A01D 82/02* (2006.01)
*A01D 43/10* (2006.01)

(52) U.S. Cl.
CPC ........... *A01D 82/02* (2013.01); *A01D 43/102* (2013.01)

(58) Field of Classification Search
None
See application file for complete search history.

(56) References Cited

U.S. PATENT DOCUMENTS 10,912,255 B2 2/2021 Rotole et al.
11,950,537 B2 * 4/2024 Steidinger ............ A01D 43/102

2021/0037709 A1 * 2/2021 Smith .................... A01D 43/10
2021/0084820 A1 * 3/2021 Vandike ............... A01B 79/005
2021/0181078 A1 * 6/2021 Marzu .................. A01D 41/127
2021/0259148 A1 * 8/2021 Schmidt .............. G05D 1/0227
2021/0267121 A1 9/2021 Childs
2021/0360856 A1 11/2021 Fay, II
2021/0360857 A1 * 11/2021 Steidinger .............. A01D 82/02
2021/0368685 A1 * 12/2021 Wisdom ............... G06V 20/188
2022/0226871 A1 * 7/2022 Kraus .................... A01D 82/00

FOREIGN PATENT DOCUMENTS

EP 1 166 619 B1 3/2008
WO 2019138278 A1 7/2019
WO 2019232189 A1 12/2019

OTHER PUBLICATIONS

Extended European Search Report for EP Application No. 23197787.7 dated Feb. 21, 2024 (10 pages).

* cited by examiner

Primary Examiner — Peter D Nolan
Assistant Examiner — Jacob Kent Besteman-Street
(74) Attorney, Agent, or Firm — Buchanan Ingersoll & Rooney PC

(57) ABSTRACT

An agricultural machine system, includes: an agricultural machine; a control system operatively coupled with the agricultural machine, the control system including: a sensor configured for: sensing a cut stubble of a plant material; outputting a cut stubble signal corresponding to the cut stubble; a controller system operatively coupled with the sensor and configured for: receiving the cut stubble signal; determining a cut stubble characteristic based at least in part on the cut stubble signal; outputting an output signal based at least in part on the cut stubble characteristic.

20 Claims, 6 Drawing Sheets

660

661 — Providing an agricultural machine system.

662 — Sensing a cut stubble.

663 — Outputting a cut stubble signal.

664 — Receiving the cut stubble signal.

665 — Determining a cut stubble characteristic.

666 — Outputting an output signal.

AGRICULTURAL SYSTEM FOR SENSING PLANT MATERIAL

FIELD OF THE INVENTION

The present invention pertains to agricultural systems, and, more specifically, to control systems of agricultural systems used to harvest forage.

BACKGROUND OF THE INVENTION

Generally speaking, forage (which can also be referred to herein as crop, crop material, forage crop, forage material, or forage crop material) is plant material that can be harvested and provided to livestock or other animals as fodder, including but not limited to cattle, sheep, goats, and horses, during, for example, the winter or at other times when pasture land has inadequate amounts of vegetation for livestock or other animals. Depending upon the processing of the forage, forage can be formed into hay or silage. Both hay and silage can be made from grass and legumes (or mixtures thereof), and silage can also be made from, for example, corn or wheat. Hay (whether grass hay, legume hay, or a mixture thereof) results from a process that includes planting (though the plant matter is often perennial), growing, cutting, drying, and storing. Depending upon location, grass hay can include, for example, orchard grass, timothy, fescue, brome, Bermuda grass, Kentucky bluegrass, and/or ryegrass, whereas legume hay can include, for example, alfalfa, clover, and/or birdsfoot trefoil. Silage (which can, at least in some circumstances, also be referred to as haylage) can involve causing the crop material to ferment.

Further, depending upon the desired end product with respect to the forage (i.e., hay or silage), a variety of forage processing operations can be involved, and these forage processing operations include haymaking operations and silage-making operations. Haymaking operations, for example, can include planting, cutting (which can be referred to as mowing), conditioning, tedding, raking, merging, chopping, baling, bale retrieval, transport, and/or storage, and silage-making operations can include not only planting and cutting but also chopping, baling, and/or ensiling (or at least some sort of covering). A variety of agricultural harvesting machines can be used to perform these operations. Such agricultural machines include planters, mowers, mower-conditioners, tedders, rakes, mergers, choppers, balers, and bale retrievers.

As indicated, one such agricultural harvesting machine is a mower-conditioner machine (which can also be referred to as a mower-conditioner). Such mower-conditioner machines can be formed as a pull-type mower-conditioner coupled with a tractor, or, alternatively, a header attachment to a self-propelled windrower. Farmers may operate such mower-conditioners to cut any sort of crop material (hay crop, wheat, etc.) from a field, to immediately condition the crop material, and to deposit the cut crop into swaths or windrows on the field (hereinafter, windrow is used to refer to both swaths and windrows, unless stated otherwise). The cutting can be performed by a cutting mechanism of the mower-conditioner, the cutting mechanism (which can also be referred to as a cutter bar) being, for example, a series of rotary discs (which can be referred to as discs), or a sicklebar. Such conditioning can be performed by a pair of conditioning rolls (which can be referred to collectively as the conditioner) of the mower-conditioner, a crop mat flowing therebetween, and the conditioning can break, split, bend, crush, crack, and/or crimp the crop material, as is known. After conditioning the crop material, the crop material can engage a swath gate of the mower-conditioner and, optionally, windrow shields of the mower-conditioner or the self-propelled windrower, before being deposited on the ground. That is, the swath gate on the mower-conditioner is used to direct crop material ejected from the conditioner either down toward the ground to deposit a wide swath or directed toward the windrow shields to form the windrow.

Regardless of which equipment crop grower use, such growers at times need to make a decision as to when to replace a stand of crop material in a given field, for example, a stand of alfalfa. Such a decision can be based upon plant population, which, in the case of alfalfa for example, can refer to the number of alfalfa stems in a predetermined unit area. For instance, if the population is below 55 stems per square foot, the alfalfa yield is generally reduced, and, if the number of stems per square foot is less than 40, the alfalfa stand in a given field should be replaced with another crop material; for, such a low stem count causes substantially reduced yield and thus substantially reduced revenue from the stand in the field. The conventional method for obtaining this information as to plant population is to manually scout the field, which is time consuming and is often not done accurately enough.

What is needed in the art is a way to improve knowing when to replace a stand of crop material.

SUMMARY OF THE INVENTION

The present invention provides an agricultural system with a control system configured for sensing a cut stubble of a plant material, and using what is sensed to determine, for example, when to replace a stand of crop material.

The invention in one form is directed to an agricultural machine system, including: an agricultural machine; a control system operatively coupled with the agricultural machine, the control system including: a sensor configured for: sensing a cut stubble of a plant material; outputting a cut stubble signal corresponding to the cut stubble; a controller system operatively coupled with the sensor and configured for: receiving the cut stubble signal; determining a cut stubble characteristic based at least in part on the cut stubble signal; outputting an output signal based at least in part on the cut stubble characteristic.

The invention in another form is directed to a control system of an agricultural machine system, the agricultural machine system including an agricultural machine and the control system which is operatively coupled with the agricultural machine, the control system including: a sensor configured for: sensing a cut stubble of a plant material; outputting a cut stubble signal corresponding to the cut stubble; a controller system operatively coupled with the sensor and configured for: receiving the cut stubble signal; determining a cut stubble characteristic based at least in part on the cut stubble signal; outputting an output signal based at least in part on the cut stubble characteristic.

The invention in yet another form is directed to a method of using an agricultural machine system, the method comprising the steps of: providing the agricultural machine system, which includes an agricultural machine and a control system operatively coupled with the agricultural machine; sensing, by a sensor of the control system, a cut stubble of a plant material; outputting, by the sensor, a cut stubble signal corresponding to the cut stubble; receiving, by a controller system operatively coupled with the sensor, the cut stubble signal; determining, by the controller system, a cut stubble characteristic based at least in part on the cut stubble signal; and outputting, by the controller system, an output signal based at least in part on the cut stubble characteristic.

An advantage of the present invention is that it provides for sensing image(s) of cut stubble, assessing the image(s), and generating plant population data for a user.

Another advantage of the present invention is that it provides for monitoring the stem size (i.e., diameter) of cut stubble in order to actively set and adjust a roll gap on a mower-conditioner.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with an agricultural vehicle, an agricultural machine, and/or components thereof are usually determined with reference to the direction of forward operative travel of the agricultural vehicle and/or agricultural machine, but they should not be construed as limiting. The terms "longitudinal" and "transverse" are determined with reference to the fore-and-aft direction of the agricultural vehicle and/or agricultural machine and are equally not to be construed as limiting. The terms "downstream" and "upstream" are determined with reference to the intended direction of crop material flow during operation, with "downstream" being analogous to "rearward" and "upstream" being analogous to "forward."

Figure 1:
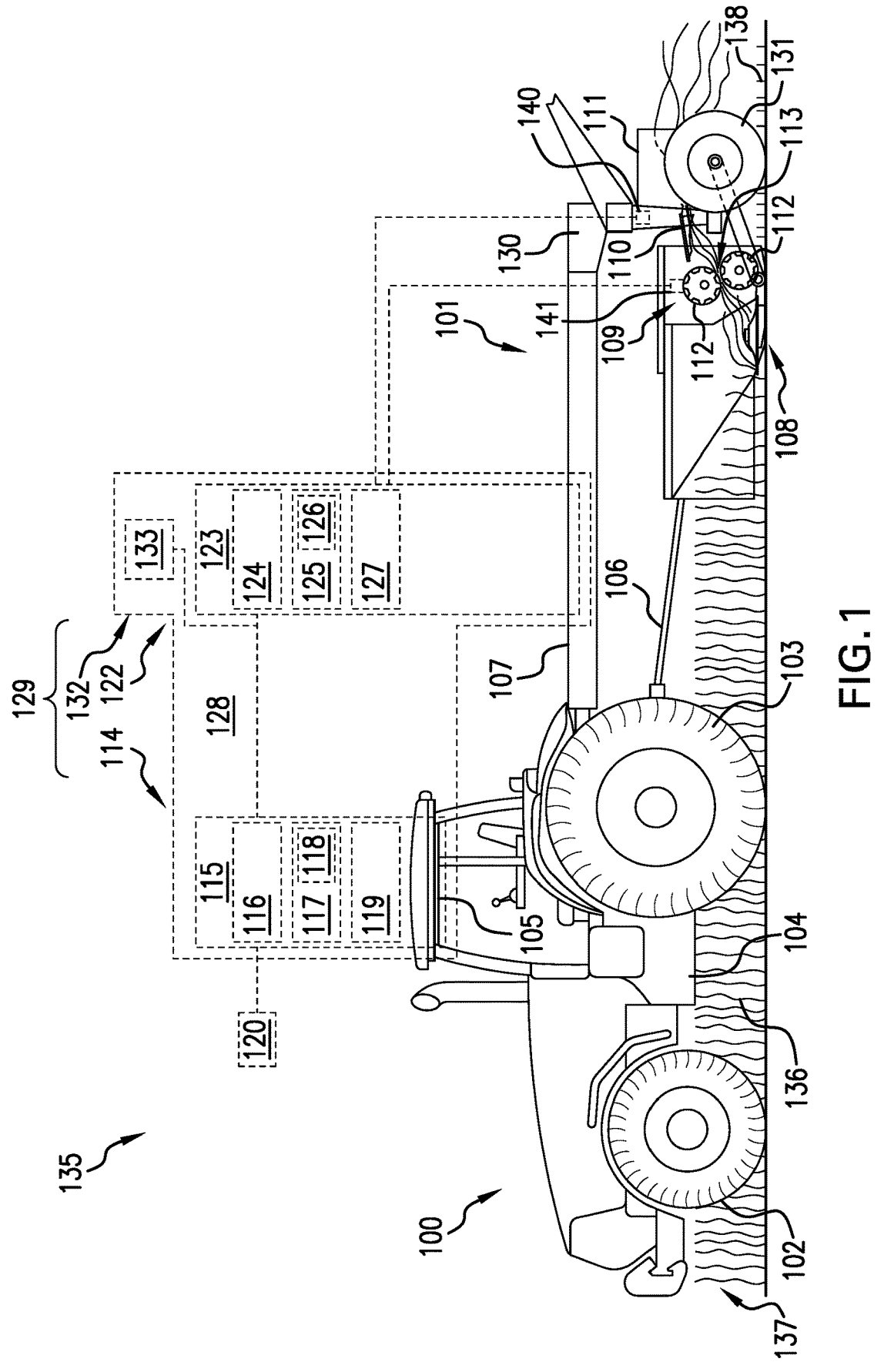
FIG. 1 illustrates schematically a side view of an exemplary embodiment of an agricultural machine system including an agricultural work vehicle, formed as a tractor, a mower-conditioner machine, and a control system, in accordance with an exemplary embodiment of the present invention.

Referring now to the drawings, and more particularly to FIG. 1, there is shown an embodiment of an agricultural machine system 135 according to the present invention, system 135 including an agricultural work vehicle 100 (which can be referred to as a work vehicle, or an agricultural vehicle) and an agricultural machine 101 (which, at least in some embodiments of the present invention, can be referred to as an agricultural implement, or an implement), which is formed as a mower-conditioner machine 101 (which can be referred to as a mower-conditioner) and is being towed by, and thus coupled with, agricultural work vehicle 100, agricultural machine 101 being configured for performing an agricultural operation within a field, namely, mowing and conditioning, in this embodiment of the present invention. As shown, work vehicle 100 can be configured as an agricultural tractor. Further, agricultural machine system 135 includes a control system 129 (which can be referred to as a unified control system 129). Unified control system 129 includes control system 114 of tractor 100, control system 122 of mower-conditioner 101, and, optionally, a control system 132 (of any sort of computing mechanism and/or of a data center) that is cloud-based, Internet-based, and/or remotely located (this control system 132 can be substantially similar to control systems 114, 122, having a controller, a processor, memory, data, and instructions, as described below with respect to control systems 114, 122). Control system 114 includes controller 115, control system 122 includes controller 123, and, if employed, control system 132 includes controller 133. Further, unified system 129 can be said to include controller system 128, which includes controllers 115, 123, and, optionally, controller 133. Control system 129, and thus also control systems 114, 122, 132 are operatively coupled with each of frames 104, 130, and thus also with tractor 100 and mower-conditioner 101. Control system 114, in whole or in part, is further included as part of work vehicle 100, and control system 122, in whole or in part, is further included as part of mower-conditioner 101.

Work vehicle 100 can be an operator-driven tractor or an autonomous tractor. However, in some embodiments, work vehicle 100 may correspond to any other suitable vehicle configured to tow a mower-conditioner machine across a field or that is otherwise configured to facilitate the performance of a mowing-conditioning operation, including an autonomous mower-conditioner vehicle. It should be further appreciated that mower-conditioner 101, while shown as being towed by tractor 100, may also be a self-propelled mower-conditioner that does not rely on a separate vehicle for propulsion and/or power to function.

Work vehicle 100 includes a pair of front wheels 102, a pair of rear wheels 103, and a chassis 104 (which can also be referred to as a work vehicle frame 104 or tractor frame 104) coupled to and supported by the wheels 102, 103. An operator's cab 105 may be supported by a portion of the chassis 104 and may house various input devices for permitting an operator to control the operation of work vehicle 100 and/or mower-conditioner 101. Additionally, work vehicle 100 may include an engine and a transmission mounted on chassis 104. The transmission may be operably coupled to the engine and may provide variably adjusted gear ratios for transferring engine power to wheels 103 via a drive axle assembly. Control system 114, in whole or in part, can be coupled with frame 104.

As shown in FIG. 1, work vehicle 100 may be coupled to mower-conditioner 101 via a power take-off (PTO) 106 (which includes a PTO shaft) and a tongue 107 (which can be connected to a hitch of work vehicle 100 to allow vehicle 100 to tow mower-conditioner 101 across the field).

As such, work vehicle 100 may, for example, guide mower-conditioner 101 toward crop material 136 standing in the field, such that mower-conditioner 101 in FIG. 1 is a pull-type mower-conditioner 101. As is generally understood, mower-conditioner 101, in addition to PTO 106 (which can be deemed to be part of tractor 100 or mower-conditioner 101) and tongue 107, includes frame 130, cutting mechanism 108, crop conditioner 109, a pivotable swath gate 110, and windrow shields 111 (cutting mechanism 108, crop conditioner 109, swath gate 110, and windrow shields 111 each being coupled with frame 130). Cutting mechanism 108 is configured for cutting standing crop material 136 and further conveying crop material 136 rearwardly. Cutting mechanism 108 can be configured as a plurality of rotating discs which sever crop material 136 (as shown in FIG. 1), or, alternatively, as a plurality of reciprocating knives (such as a sicklebar). In a crop flow direction, subsequent to cutting mechanism 108 crop material 136 encounters two conditioning rolls 112. Crop conditioner 109 includes two conditioner rolls 112 (which can also be referred to as conditioning rolls, and which are coupled with frame 130). Rolls 112 rotate opposite one another (in FIG. 1, the top roll 112 rotates counter-clockwise, and the bottom roll 112 rotates clockwise) and form a gap 113 therebetween (which can be referred to as a roll gap 113), through which the cut crop material 136 flows so as to be conditioned (i.e., breaking, splitting, bending, crushing, cracking, and/or crimping crop material 136). One or both conditioner rolls 112 can be driven, at least indirectly, by a mechanical input to mower-conditioner 101, in this case, by the PTO shaft of PTO 106, so as to impart a motive force to crop material 136 rearward. Thus, conditioner rolls 112 rotate with a speed (revolutions per minute (RPM)), which can be referred to as a conditioner speed (herein, unless specified otherwise, the conditioner speed refers to the angular velocity of rolls 112, wherein velocity and speed can be used interchangeably herein). Subsequent to conditioner rolls 112, a mat of crop material 136 strikes an underside of swath gate 110, in order to form a wide swath of crop material on the ground, or a narrower windrow, depending upon positioning of swath gate 110. Subsequent to swath gate 110, crop material 136 can optionally strike windrow shields 111 (which can also be referred to as side shields), which can be positioned so as to form a windrow of crop material 136 on the ground. More broadly, cutting mechanism 108 is configured for cutting any plant material 137 standing in the field; such plant material 137 includes crop material 136 and non-crop plant material (not specifically labeled in FIG. 1). Crop material 136 can include, for example, any forage material, such as legumes (i.e., alfalfa) or grasses. Such non-crop pant material can include, for example, weeds of any sort. Mower-conditioner 101 further includes ground-engaging field wheels 131.

Further, work vehicle 100 includes control system 114, which includes controller 115, which includes a processor 116, memory 117, data 118, and instructions 119. Control system 114 can further include an input/output device 120 such as a laptop computer (with keyboard and display), a touchpad (including keypad functionality and a display), and/or one or more switches, device 120 being configured for a user to interface therewith. Optionally, device 120 can be a plurality of devices spaced apart, for example, in cab 105 that allows operator to make inputs to controller 115.

Further, mower-conditioner 101 includes control system 122, which includes controller 123, which includes a processor 124, memory 125, data 126, and instructions 127. Controller 123 can communicate with controller 115, so that controller 115 outputs information to the display of input/output device 120 of work vehicle 100, thereby informing a user of various conditions of mower-conditioner 101. Further, mower-conditioner 101 includes a frame 130 (which can be referred to as mower-conditioner machine frame 130, or more generally as a machine frame 130) to which all of the components of mower-conditioner 101 are directly or indirectly coupled. Control system 122, in whole or in part, can be coupled with frame 130.

It should be appreciated that the configuration of work vehicle 100 described above and shown in FIG. 1 is provided only as one example. Thus, it should be appreciated that the present disclosure may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer work vehicle, or rely on tracks in lieu of wheels 102, 103. Additionally, as indicated previously, work vehicle 100 may, in some embodiments, be configured as an autonomous vehicle. In such embodiments, work vehicle 100 may include suitable components for providing autonomous vehicle operation and, depending on the vehicle configuration, need not include the operator's cab 105.

Additionally, it should be appreciated that the configuration of mower-conditioner 101 described above and shown in FIG. 1 is provided only as one example. Thus, it should be appreciated that the present disclosure may be readily adaptable to any manner of mower-conditioner configuration, or other agricultural machines, such as a vehicle and/or implement, or a header.

Further, in general, controllers 115, 123 may each correspond to any suitable processor-based device(s), such as a computing device or any combination of computing devices. Each controller 115, 123 may generally include one or more processor(s) 116, 124 and associated memory 117, 125 configured to perform a variety of computer-implemented functions (e.g., performing the methods, steps, algorithms, calculations and the like disclosed herein). Thus, each controller 115, 123 may include a respective processor 116, 124 therein, as well as associated memory 117, 125, data 118, 126, and instructions 119, 127, each forming at least part of the respective controller 115, 123. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the respective memory 117, 125 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 117, 125 may generally be configured to store information accessible to the processor(s) 116, 124, including data 118, 126 that can be retrieved, manipulated, created, and/or stored by the processor(s) 116, 124 and the instructions 119, 127 that can be executed by the processor(s) 116, 124. In some embodiments, data 118, 126 may be stored in one or more databases. Controller 133 is substantially similar to controllers 115, 123, having a processor, memory, data, and instructions, as described with respect to controllers 115, 123.

Tractor controller 115, herein, is assumed to be the primary controller for controlling operations of tractor 100, and mower-conditioner controller 123, herein, is assumed to be the primary controller for controlling operations of mower-conditioner 101, though it is understood that at different times each of controllers 115, 123 can control any of the other of the controllers 115, 123. Controllers 115, 123, as indicated in FIG. 1, can be in communication with the other of controllers 115, 123, thereby forming at least parts of unified control system 129, such that any or all information associated with any controller 115, 123 can be shared with the other of controllers 115, 123, and any controller 115, 123 can perform the functions of the other controllers 115, 123. Controllers 115, 123 can communicate with each other in any suitable manner, such as a wired connection or a wireless connection, such as radio signals (RF), light signals, cellular, WiFi, Bluetooth, Internet, via cloud-based devices such as servers, and/or the like. Controllers 115, 123 can be configured to perform any of the functions of any of the other controllers 115, 123. Controllers 115, 123 can be a part of any network facilitating such communication therebetween, such as a local area network, a metropolitan area network, a wide area network, a neural network, whether wired or wireless. Control system 129, and controller system 128, are operatively coupled with tractor 100 and mower-conditioner 101, in particular with frames 104, 130. According to an embodiment of the present invention, tractor controller 115 can issue commands to mower-conditioner controller 123. This is assumed to be the case herein, unless otherwise stated. According to an alternative embodiment of the present invention, mower-conditioner controller 123 can issue commands to tractor controller 115 (such as for ISOBUS III or higher implements and/or vehicles). This is assumed to be the case herein, unless otherwise stated. Further, the controller 133 of control system 132, if employed, can communicate with controllers 115, 123 or any other element of control system 129 in any suitable manner (such as what is described relative to controllers 115, 123), can perform any or all of the functions described herein relative to controllers 115, 123, and can thus optionally substitute for any or both of controllers 115, 123.

Control system 129 can include additional sensors or other inputs. Control system 114 can further include a GPS (not shown) mounted on tractor 100 (the tractor GPS). The tractor GPS senses the location of tractor 100 within the field, as is known, and this data can be provided to controllers 115, 123. Similarly, control system 122 can further include a GPS (not shown) mounted on mower-conditioner 101 (the mower-conditioner GPS). The mower-conditioner GPS senses the location of mower-conditioner 101 within the field, as is known, and this data can be provided to controllers 115, 123. Further, the operator, by way of device 120, can input or make certain settings. Control system 129 can further include any number additional control systems (with their individual controllers, processors, memory, data, and instructions, substantially similar to what is described above with reference to control systems 114, 122), and any such control system can have input/output devices as a part thereof and/or connected thereto.

Mower-conditioner 101, and also control system 122, further includes at least one sensor 140 (which can be referred to as cut stubble sensor 140), which is coupled with frame 130 and shown schematically in FIG. 1. As indicated in FIG. 1, sensor 140 can be coupled, for example, with frame 130, downstream or behind cutter mechanism 108. Sensor 140 is configured for sensing a cut stubble 138 of a plant material 137, and for outputting, to controller 123 and controller system 128, a cut stubble signal corresponding to the cut stubble 138. Cut stubble 138 is what is left of plant material 137 standing in the field after plant material 137 is cut by cutter mechanism 108. Individual ones of cut stubble 138 in FIG. 1 are shown as substantially vertical stems. Further, because a swath can cover much of a field, sensor 140 can be positioned on mower-conditioner 101 so as to capture images of cut stubble 138 in between the swaths (that is, near the outside of mower-conditioner 101). Cut stubble 138 has at least the following characteristics (which can be referred to as properties): a stem height, which is in a longitudinal extent of cut stubble 138 (extending from the ground to a top of cut stubble 138); a stem diameter, which is in a transverse extent of cut stubble 138 (for vertical cut stubble, this transverse extent is substantially horizontal and thus parallel with the ground as shown in the page of FIG. 1); and a stem orientation (which can refer to, for example, (i) an angle between a horizontal line and a line projecting across a top (distal/free end) of cut stubble 138, this angle reflecting a cut angle; (ii) an angle between a vertical line and a longitudinal axis of cut stubble 138, and/or (iii) a degree to which the top of cut stubble 138 is a clean cut or a frayed cut). Sensor 140 can be configured for sensing whatever is in a field of view of sensor 140 and thus can be any suitable sensor. Sensor 140 can be an optical or visual sensor, such as a camera, a lidar sensor, and/or a radar sensor (which can be deemed to be a kind of image or optical sensor herein); nevertheless, any optical or visual sensor capable of sending an image to controller system 128 can be used. Thus, by way of such sensing, sensor 140 can generate digital images corresponding to what is sensed, such images including but not necessarily being limited to cut stubble 138. Sensor 140 is configured for outputting an image signal corresponding to the images sensed by sensor 140 to controller 123. These images can be taken continuously by sensor 140. The primary focus of the visual field of sensor 140 is cut stubble 138. The images sensed by sensor 140 can be processed by sensor 140, by controller 115, 123, and/or by an off-site controller associated with control system 129. It is assumed herein, unless stated otherwise, that the images from sensor 140 are processed by controller 123. Further, the images sensed by sensor 140, in particular of cut stubble 138, include at least one cut stubble characteristic which can be ascertained by controller 123 for further outputs.

Controller system 128, such as controller 123, which is operatively coupled with sensor 140, is configured for: (a) receiving the cut stubble signal; (b) determining at least one cut stubble characteristic based at least in part on the cut stubble signal; (c) outputting an output signal based at least in part on the cut stubble characteristic. Regarding (b), using for example on board software with processing algorithms, controller 123 processes the images including images of cut stubble 138 in order to determine the cut stubble characteristic. For instance, using the images, controller 123 can determine at least one of the following cut stubble characteristics: the types and number of types of plant material 137 in a predetermined unit area (controller 123 identifies and counts the different types of plants); the number of crowns in a predetermined unit area (a single plant possibly having a crown (i.e., alfalfa), from which branches a plurality of stems)(controller 123 identifies and counts the number of crowns per unit area); the number of stems in a predetermined unit area (controller 123 identifies and counts the number of stems per unit area); the diameter of each stem in a predetermined unit area; the height of each stem in a predetermined unit area; the orientation of each stem in a predetermined unit area; the amount, degree, or percentage of chlorophyll in a given stem (so that controller 123 can further determine whether the stem at issue is from newly cut plant material 137, or from an older cutting operation). Thus, among other alternatives, the cut stubble characteristic can correspond to a size of the stem of the cut stubble (i.e., diameter, height) in a predetermined area and a number of the stems in the predetermined area.

Further, based at least in part on any or all of this information with respect to the cut stubble characteristic(s), controller 123 can be configured to generate plant population data for the operator and/or a plant population map. Such plant population data can include, for example, the number of stems for a specific type of plant per square foot, and/or the percentage of the plants in a given field or a sub-section of the field (for instance, X % alfalfa, Y %, grass, and Z % weeds); and such a plant population map can include such information and can also can map out the distribution (that is, the location) of such pants for a given field or sub-section of the field (which can employ GPS coordinates).

Regarding (c), the output signal from controller 123 can be or otherwise contain any or all of the information determined by controller (the information just mentioned above with respect to (b). For example and not by way of limitation, the output signal can be or otherwise contain a plant population signal, and/or a plant population map signal corresponding to a plant population map generated by controller 123, 128. Advantageously, the information conveyed by the output signal can enable the grower to decide whether or not, or when, to replace a stand of crop material 136. The control system of the present invention (i.e., control system 129) includes any control system which outputs information to a user such as by outputting the output signal to a display such as input/output device 120 (for example and not by way of limitation, a smartphone, as described below, can be the agricultural machine system of the present invention (i.e., system 535, FIG. 5) which includes control system 529), and/or which outputs an adjustment signal to machine structure so as to, for example, move structure of the agricultural machine system of the present invention (i.e., system 135).

By way of example and not limitation, such a decision (whether or when to replace the stand of crop material 136) can be based upon plant population, which, in the case of alfalfa for example, can include the number of alfalfa stems in a predetermined unit area. With respect to alfalfa plants, an alfalfa plant (which may have one crown) typically has many stems (coming from a single crown, for example), and growers typically desire to have at least 40 stems per square foot. If the population is below 55 stems per square foot, the alfalfa yield is generally reduced, and, if the number of stems per square foot is less than 40, the alfalfa stand in a given field should be replaced with another crop material; for, such a low stem count causes substantially reduced yield and thus substantially reduced revenue from the stand in the field. Any or all of this information contained in output signal can be output to, for example, display 120, in order for the operator to see the information and to make decisions thereupon. The processing by controller 123 can, optionally, include machine learning techniques to identify the alfalfa stems from other (undesired) plant species. Images can be processed by controller 123 through the field so that after mowing the plant population map can be generated for the entire field. Additional information could also be generated by controller 123 as well, such areas of other plant species, such as grasses. As indicated, at least one purpose of the map is to provide growers with information so that the grower can determine if the field should continue growing a specific crop material 136, such as alfalfa, or whether the specific crop material 136 should be removed so that another crop material 136 could be grown in the field. Further, controller system 128 can include additional algorithms in order to identify the population of other forage material, such as other legumes or grasses. Thus, controller 123 can, optionally, include an artificial intelligence (AI) model for processing the images from sensor 140, such as images of alfalfa stubble, optionally immediately after mowing. The model can ascertain, for example, the number of crowns and the number of stems per unit area of the field. The model can be running throughout the field so that when the field is completed (i.e., the mowing-conditioning operation is completed in the field) controller 123 can generate of stem count per unit area across the field, for example. It can be desirable for the information to be focused on actively growing stems as compared to old stems from previous cuttings, and thus the model can look for and thus focus upon green stems (stems with a predetermined amount of chlorophyll). Further, the model can be configured to calculate, for example, the percentage of alfalfa in a predetermined area (the alfalfa population of a certain field or sub-section of the field, for example) but also the percentage of grass and weeds in the predetermined area (the grass and weed population).

Alternatively or in addition thereto, according to another embodiment of the present invention, with respect to (c) the output signal can include an adjustment signal configured for adjusting roll gap 113 of conditioner rolls 112 of mower-conditioner 101. That is, controller 123 can send the adjustment signal to an actuator 141, which is coupled with frame 130 and configured for adjusting the distance between the two conditioner rolls 112, so as to move rolls 112 closer to or farther apart from one another (by moving only the upper roll 112, the lower roll 112, or both rolls 112). Actuator 141 is shown schematically in FIG. 1 and associated with upper roll 112, but it can be appreciated that actuator 141 can be associated with either or both rolls 112, and that more than one actuator 141 can be employed. By way of example and not limitation, actuator 141 can be a fluid actuator (such as a hydraulic actuator or a pneumatic actuator), an electric actuator (such as an electromechanical actuator or an electrohydraulic actuator), an electronic actuator, and/or a mechanical actuator. Herein, actuator 141 is assumed to be formed as a fluid actuator, more specifically, as a hydraulic actuator assembly, according to an exemplary embodiment of the present invention. Further, though not shown, control system 122 can further include a position sensor(s) associated with the one or more conditioner roll 112 which is configured to be moved by actuator 141 so as to adjust roll gap 113. The position sensor is configured for sensing the actual position of either or both roll 112 and outputting, to controller 123, a position signal corresponding to the actual position of either or both roll 112; and, controller 123 is configure for receiving this position signal and further for adjusting the position of roll(s) 112 and thus roll gap 113 based at least in part on this position signal, the cut stubble signal, and thus a desired position of roll(s) 112 as determined by controller 123.

With further reference to this embodiment (adjusting roll gap 113 based upon cut stubble characteristics, such as stem diameter), the setting of roll gap 113 is critical to optimizing conditioning quality, and roll gap 113 must be optimized to the size of the stems being cut. For example, large stem alfalfa will require a larger roll gap 113 than small stem alfalfa, due to the damaging effects, such as bruising of leaves, of a roll gap 113 that is too narrow on the larger stem crop. The ideal gap 113 is one that will crack the stem to allow moisture to escape, while not being so small as to crush the stem and leaves. Further, stem size (i.e., stem diameter) can vary in the same field due to variation in growth patterns, which can be compensated for actively if the stem size of cut stubble 138 is actively measured immediately after being cut, as provided for by the present invention. Thus, according to this embodiment of the present invention, sensor 140 can be mounted to mower-conditioner 101 in an area where cut stubble 138 can be viewed from above immediately after cutting in order to measure stem size and to adjust conditioner roll gap 113 accordingly. Thus, sensor 140, which is configured for creating a digital image of cut stubble 138, is mounted to the rear of the cutter mechanism 108 in an area where cut stubble 138 is visible from directly above, this area optionally being near or beside one of the field wheels 131 on a pull-type mower or mower-conditioner 101 (or, aft of header side cheeks on a self-propelled mower or mower-conditioner, as with respect to FIG. 4). Controller 123 can process image(s) from sensor 140 so as to calculate a stem size measurement (i.e., stem diameter), to calculate an optimum setting of roll gap 113, and can output a roll gap adjustment command, as described. At the beginning of a mowing operation, controller 123 can set roll gap 113 to a "standard" setting, which can be, as is known, an average setting for crop material 136 being cut. As soon as the mowing (or mowing-conditioning) operation begins, and sensor 140 is able to "see" cut stubble 138, the stem size (i.e., diameter) is calculated by controller 123 and roll gap 113 is adjusted accordingly. The setting of roll gap 113 can be a percentage of the average stem size (i.e., diameter) being monitored. Since the stem size is being measured just behind cutter mechanism 108, the roll gap adjustments are very close to real time, thus optimizing conditioning quality.

Further regarding this embodiment involving adjusting roll gap 113, the following field control logic can be included. That is, the operator of mower-conditioner 101 begins the mowing operation. Upon doing so, controller 123 commands a "standard" setting (s) for roll gap 113. Sensor 140 takes image(s) of cut stubble 138 behind cutting mechanism 108 and outputs this to controller 123 as an input to controller 123. Controller 123 then calculates the stem diameter (d) of the various stems in the image(s) of cut stubble 138, wherein d can optionally be an average stem diameter within a predetermined unit area. Further, controller 123 calculates the desired roll gap (g), wherein g=αd; α is a constant of roll gap 113 to stem diameter and can be specific to each specific crop material 136 (for instance, a can be such that the optimum roll gap (g) is predetermined percentage (α) of stem diameter (d) for the specific crop material 136 being harvested). Further, ifs is equal to g, then controller 123 takes no further action. However, if s is not equal to g, then controller 123 can inquire as to whether s is greater than g. Ifs is greater than g, then controller 123 can increase roll gap 113 to the amount of g. Conversely, ifs is not greater than g, then controller 123 can decrease roll gap 113 to the amount of g.

Further, alternatively or in addition thereto, according to another embodiment of the present invention, data from sensor 140 can be used to assess a cutting quality of a mower of mower-conditioner 101. For instance, stem diameter, stem height, and/or stem orientation can be used by controller 123 to adjust any settings of the mower that can affect the cutting quality of the mower, such as stem diameter and/or stem height. Thus, for instance, a height of cutting mechanism 108 can be adjusted (manually by the operator, or automatically by an actuator and thus immediately) if the height of stems 138 are too long or too short.

Figure 2:
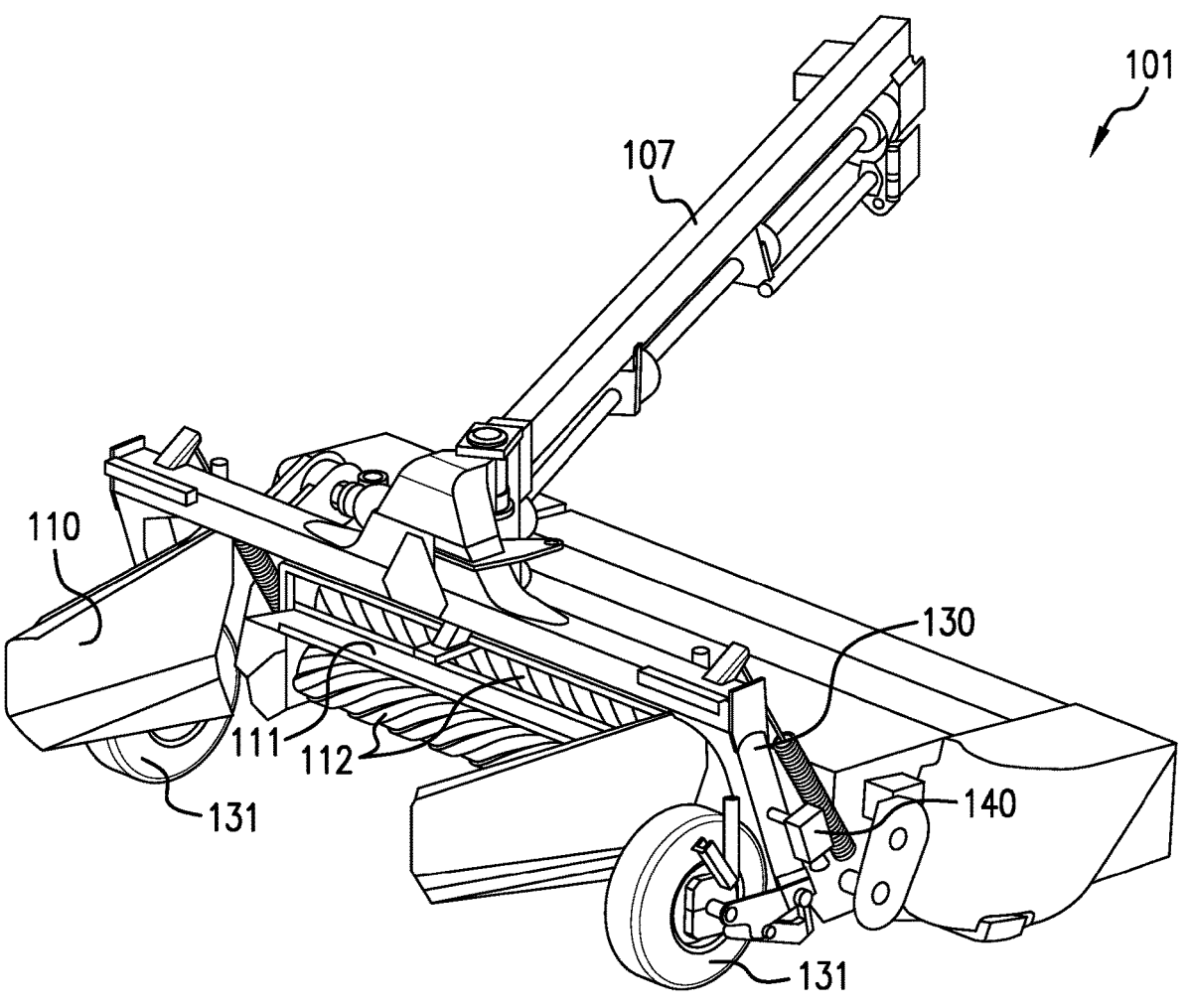
FIG. 2 illustrates a perspective view of the mower-conditioner machine of FIG. 1, in accordance with an exemplary embodiment of the present invention.

Referring now to FIG. 2, there is shown a perspective view of mower-conditioner 101 (formed as a center pivot mower-conditioner 101). Sensor 140 is mounted to an external portion of frame 130, more specifically, to a trail frame beside right-side field wheel 131. Further, as shown, sensor 140 is not only aimed downward toward the ground but can optionally be angled forward. In this location on frame 130, sensor 140 can view crop stubble 138, rather than a swath or windrow of crop material 136. Further, though grooves and/or raised areas of rolls 112 are shown extending in certain directions in FIG. 2, it can be appreciated that this is provided only for illustrative purposes and that such grooves and/or raised areas can extend in any suitable direction(s).

Figure 3:
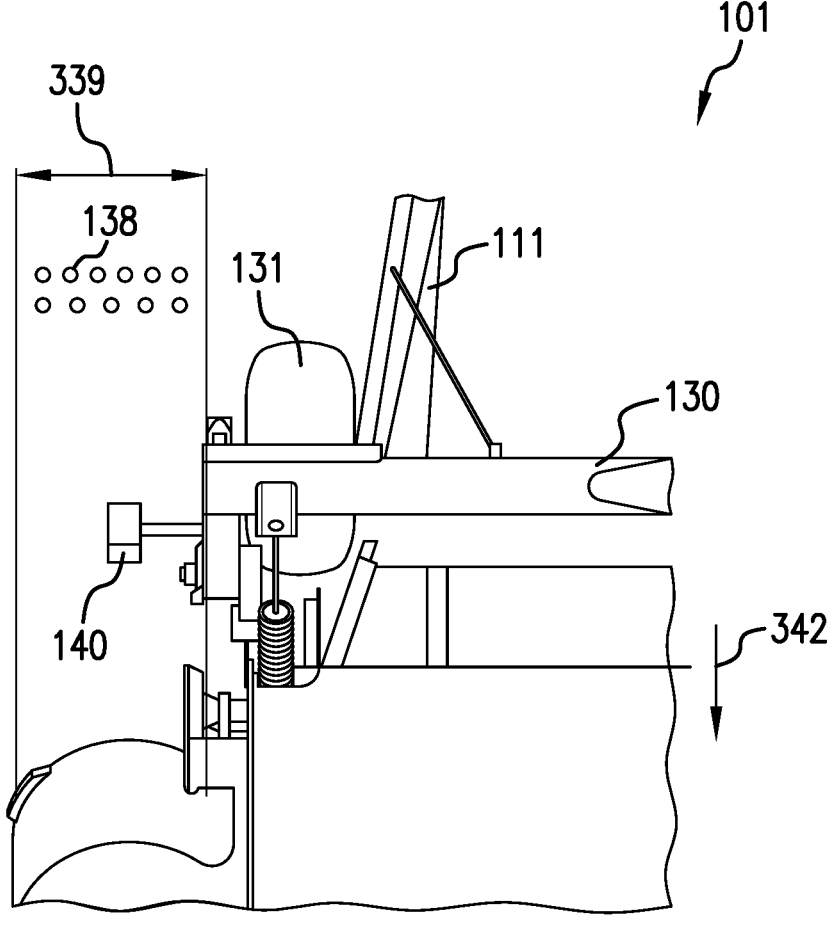
FIG. 3 illustrates a top view of the mower-conditioner machine of FIG. 1, with portions broken away, in accordance with an exemplary embodiment of the present invention.

Referring now to FIG. 3, there is shown a top view of mower-conditioner 101, with portions broken away. Mower-conditioner 101 is shown to include frame 130 with sensor 140 and windrow shield 111 attached thereto, and to be moving in a direction 342 across the field. Further, FIG. 3 shows sensor 140 to be pointed at least generally downwards so as to be able to view cut stubble 138. More specifically, according to an exemplary embodiment of the present invention, sensor 140 is aimed to monitor cut stubble 138, and is thus not aimed at windrows or swaths deposited by mower-conditioner 101 or uncut crop material 136. Thus, sensor 140 can monitor uncut stubble 138 in a region 339. Further, only a few stems of cut stubble 138 are shown in FIG. 3, for illustrative purposes. The distance across each stem in this view corresponds to the stem diameter.

Figure 4:
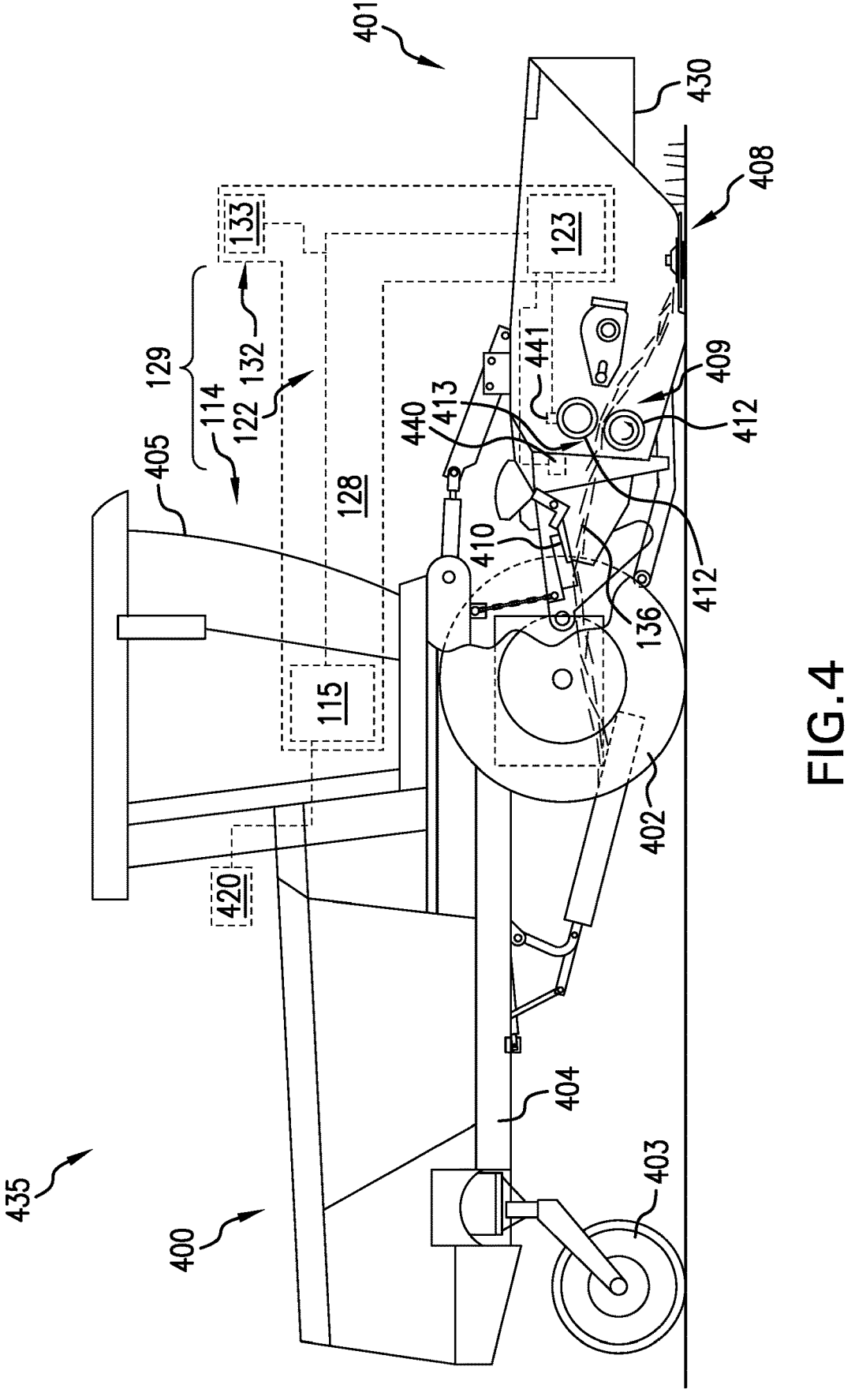
FIG. 4 illustrates schematically a side view of another exemplary embodiment of an agricultural machine system, in accordance with an exemplary embodiment of the present invention.

Referring now to FIG. 4, there is shown agricultural machine system 435, according to another exemplary embodiment of the present invention. Many prior reference numbers with respect to agricultural machine system 135 are increased by a multiple of 100 and thus are substantially similar to the structures and function described and shown with respect to FIGS. 1-3, unless otherwise shown and/or described differently. Thus, agricultural machine system 135 is labeled as 435 in FIG. 4. Agricultural machine system 435 includes self-propelled windrower 400 and header 401, which is a mower-conditioner 401. Windrower 400 includes frame 404, front wheels 402, rear wheels 403, cab 405, input/output device 420, control system 114, and can optionally include windrow shields (not labeled), instead of on mower-conditioner 401. Mower-conditioner 401 includes cutting mechanism 408, conditioner 409 including conditioner rolls 412, swath gate 410, control system 122, frame 430, cut stubble sensor 440, and actuator 441. System 435 further includes unified control system 129 including control systems 114, 122, and, optionally, control system 132, and controller system 128. Control system 114 includes controller 115, control system 122 includes controller 123, and control system 132 includes controller 133. System 435 is used in a manner substantially similar to what is described above with respect to system 135. Sensor 440 can be mounted to frame 430 aft of cutting mechanism 408, and, more specifically, can optionally be mounted to a rear wall or portion of mower-conditioner 401. Further, control system 129 in FIG. 4 is shown to include control system 132, but it can be appreciated that control system 132 is optional.

In use, a user can mow and condition a field of crop material 136 using system 135, 435, with mower-conditioner 101, 401. In so doing, sensor 140, 440 can take image(s) of cut stubble 138 remaining after the mowing as mower-conditioner 101, 401 traverses the field. Controller 123 can use these images to ascertain any of the various cut stubble characteristics to generate and to output to display 120, 420 a plant population map for user. Further, controller 123 can calculate an average stem diameter and use this to determine any adjustment to be made to roll gap 113, 413 so that the distance in roll gap 113, 413 can be optimized so that conditioning by rolls 112, 412 can be optimized. As indicated, controller 133 can, alternatively or in addition thereto, perform the functions described with respect to controller 123.

Figure 5:
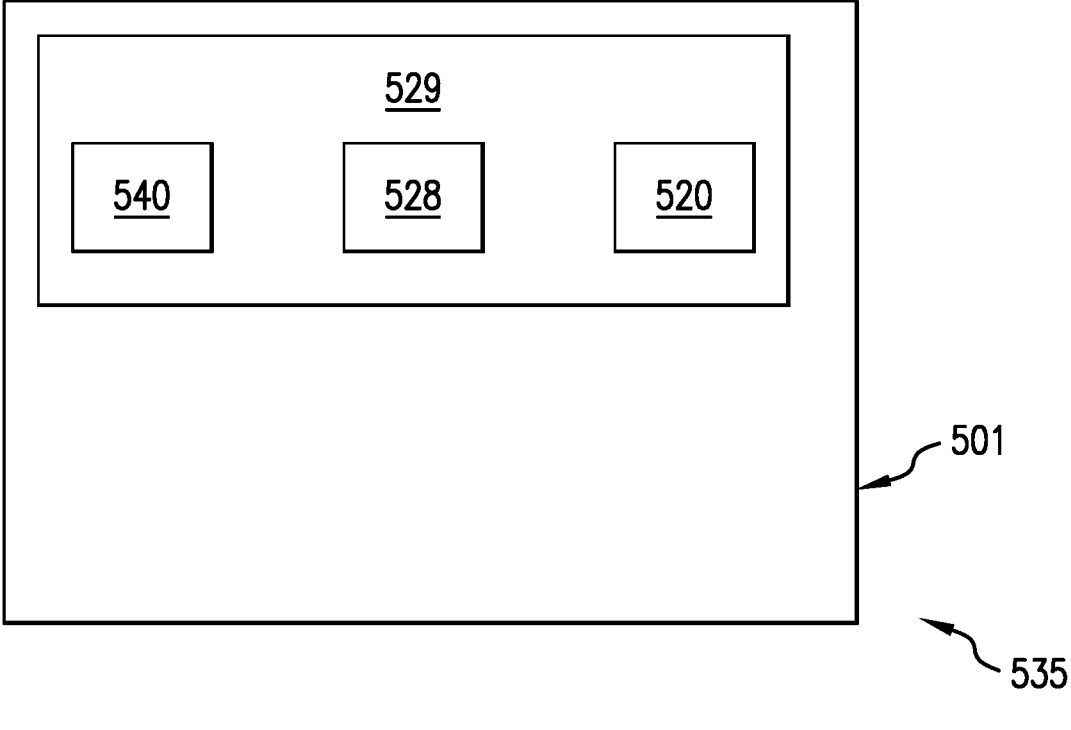
FIG. 5 illustrates schematically a general embodiment of the agricultural machine system, in accordance with an exemplary embodiment of the present invention.

Referring now to FIG. 5, there is shown a general embodiment of the present invention. That is, there is shown agricultural machine system 535. Many prior reference numbers with respect to agricultural machine system 135 are increased by a multiple of 100 and thus are substantially similar to the structures and function described and shown with respect to FIGS. 1-4, unless otherwise shown and/or described differently and/or are inherently or implicitly different. Thus, agricultural machine system 135 is labeled as 535 in FIG. 5. Agricultural machine system 535 is shown schematically and includes all embodiments of the present invention previously shown and/or described above. Thus, agricultural machine system 535 includes agricultural machine 501 and control system 529, which includes cut stubble sensor 540, controller system 528, and input/output device 520. Instead of being a mower-conditioner, agricultural machine 501 can include or otherwise be formed as a mower (without conditioner), a tedder, a rake, a merger, a baler, a planter, or a handheld device. With respect to the final alternative in this list, agricultural machine system 535 can be formed as a smartphone 535, which includes handheld device 501, which includes a smartphone frame. Further, smartphone 535 includes not only handheld device 501 but also control system 529, which includes controller system 528, which can include control system 122 (with controller 123) and optionally control system 132 (with controller 133)(control system 529 does not necessarily include control system 114). Controller 123 (not labeled in FIG. 5), as discussed above, can include software (variously referred to herein also as an algorithm or a model, such as an AI model) which, among other things, can identify any types of forage and other plant material 137, and further determine the population of any of these types of plant material 137, such as the percentage of alfalfa, other legumes, grasses, and weeds. Further, smartphone 535 can include an application (an "app") for taking pictures. Thus, in use, a user of smartphone 535 can use the app to take a picture, by way of sensor 540, of a field, a sub-section of a field, or of any area that has been mowed and has cut stubble 138. Controller 123 can process this image of cut stubble 138 and report to the user, such as by way of input/output device 520, the stem plant population of the field, sub-section, or area (as can occur above). Further, the user can take a plurality of pictures of the same area, which controller 123 can use to provide a refined understanding of the plant population (such as by way of averaging), or can take pictures of different areas of a field to obtain an understanding of the plant population of the entire field, for example. Controller 123 is further configured, as above, for generating a plant population map. Controller 133 can perform any or all functions of controller 123 and/or substitute for any or all functions of controller 123. Thus, for example, smartphone 535 may take an image of a field with cut stubble 138, and that image may be processed on board by controller 123 of smartphone 535 or sent (by way of sensor 540 and/or controller 123) to a cloud or some other computing location (collectively referred to as control system 132 with controller 133) to derive an output which can include any of the aforementioned output information, such as stem count and/or stem size.

Figure 6:
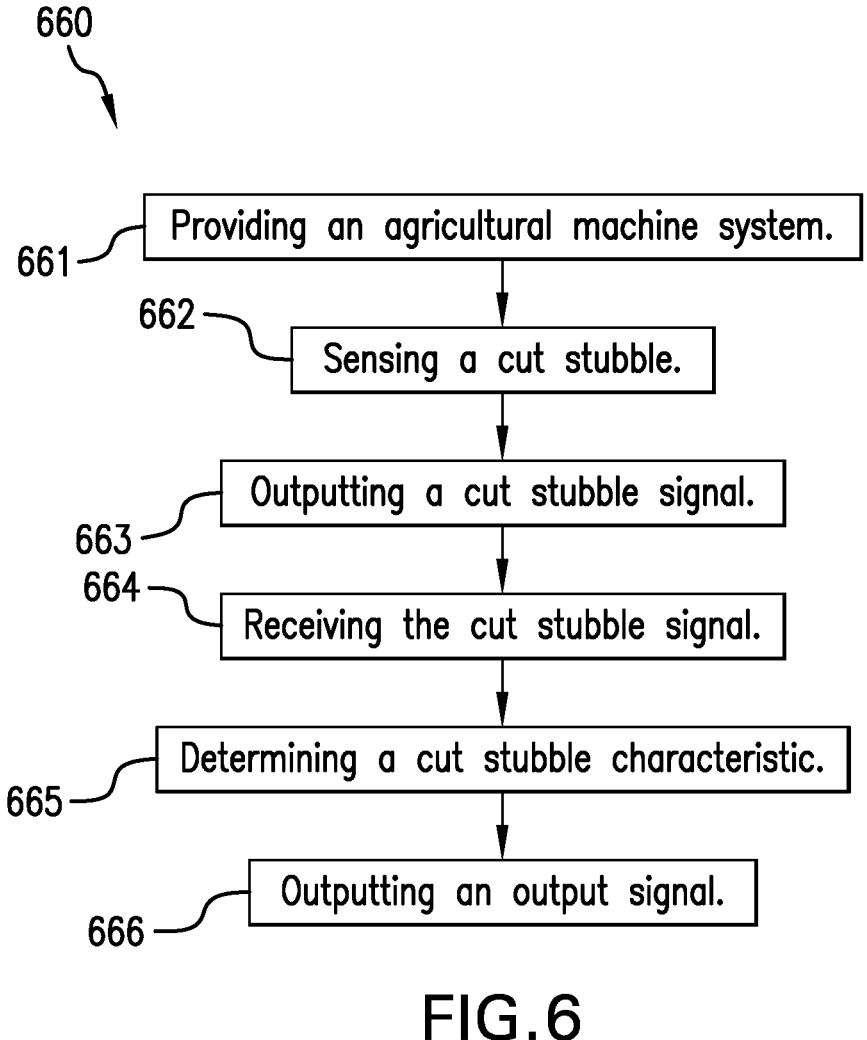
FIG. 6 illustrates a flow diagram showing a method of using an agricultural machine system, in accordance with an exemplary embodiment of the present invention.

Referring now to FIG. 6, there is shown a flow diagram showing a method 660 of using an agricultural machine system 135, 435, 535, the method 660 including the steps of: providing 661 an agricultural machine system 135, 435, 535, which includes an agricultural machine 101, 401, 501 and a control system 129, 529 operatively coupled with the agricultural machine 101, 401, 501; sensing 662, by a sensor 140, 440, 540 of the control system 129, 529, a cut stubble 138 of a plant material 137; outputting 663, by the sensor 140, 440, 540, a cut stubble signal corresponding to the cut stubble 138; receiving 664, by a controller system 128, 528 operatively coupled with the sensor 140, 440, 540, the cut stubble signal; determining 665, by the controller system 128, 528, a cut stubble characteristic based at least in part on the cut stubble signal; and outputting 666, by the controller system 128, 528, an output signal based at least in part on the cut stubble characteristic. The agricultural machine 101, 401, 501 can include a mower, a mower-conditioner, a tedder, a rake, a merger, a baler, a planter, or a handheld device. The cut stubble characteristic can correspond to at least one of a size of a stem of the cut stubble 138 in a predetermined area, a number of the stem in the predetermined area, a number of crowns of the cut stubble in the predetermined area. The output signal is: (a) an adjustment signal configured for adjusting a roll gap 113 of the mower-conditioner 101, 401; and (b) a plant population signal; and/or (c) a plant population map signal corresponding to a plant population map generated by the controller system 128, 528 based at least in part on the cut stubble characteristic. The agricultural machine system 135, 435, 535 can be a smartphone which includes the handheld device 501.

It is to be understood that the steps of method 660 are performed by controller 115, 123, 128, 528 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 115, 123, 128, 528 described herein, such as the method 660, is implemented in software code or instructions which are tangibly stored on a tangible computer readable medium. The controller 115, 123, 128, 528 loads the software code or instructions via a direct interface with the computer readable medium or via a wired and/or wireless network. Upon loading and executing such software code or instructions by controller 115, 123, 128, 528, controller 115, 123, 128, 528 may perform any of the functionality of controller 115, 123, 128, 528 described herein, including any steps of the method 660.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural machine system, comprising:

an agricultural machine including a roll gap; and a control system operatively coupled with the agricultural machine, the control system including:

a sensor configured for:

sensing a cut stubble of a plant material; and outputting a cut stubble signal corresponding to the cut stubble; and a controller system operatively coupled with the sensor and configured for:

receiving the cut stubble signal;

determining a cut stubble characteristic based at least in part on the cut stubble signal, wherein the cut stubble characteristic corresponds to a size of a stem of the cut stubble in a predetermined area, a number of the stem in the predetermined area, and an orientation of the cut stubble; and outputting an output signal to cause the agricultural machine to adjust the roll gap, wherein the output signal is based at least in part on the cut stubble characteristic.

2. The agricultural machine system of claim 1, wherein the agricultural machine is a mower-conditioner.

3. The agricultural machine system of claim 2, wherein the cut stubble characteristic further corresponds to a number of crowns of the cut stubble in the predetermined area.

4. The agricultural machine system of claim 3, wherein the output signal includes an adjustment signal configured for adjusting the roll gap of the mower-conditioner.

5. The agricultural machine system of claim 1, wherein the cut stubble characteristic further corresponds to a color of the cut stubble and wherein the controller system is configured to distinguish between actively growing stems and older cut stems based on the color of the cut stubble.

6. The agricultural machine system of claim 1, wherein the cut stubble characteristic further corresponds to a diameter of the cut stubble and a height of the cut stubble.

7. A control system of an agricultural machine system, the agricultural machine system including an agricultural machine and the control system which is operatively coupled with the agricultural machine, the control system comprising:

a sensor configured for:

sensing a cut stubble of a plant material; and outputting a cut stubble signal corresponding to the cut stubble; and a controller system operatively coupled with the sensor and configured for:

receiving the cut stubble signal;

determining a cut stubble characteristic based at least in part on the cut stubble signal, wherein the cut stubble characteristic corresponds to a size of a stem of the cut stubble in a predetermined area, a number of the stem in the predetermined area, and an orientation of the cut stubble; and outputting an output signal to cause a change in operation of the agricultural machine, wherein the output signal is based at least in part on the cut stubble characteristic.

8. The control system of claim 7, wherein the control system is configured for being a part of the agricultural machine system, the agricultural machine system includes the agricultural machine, and the agricultural machine includes a mower, a mower-conditioner, a tedder, a rake, a merger, a baler, or a planter.

9. The control system of claim 8, wherein the cut stubble characteristic further corresponds to a number of crowns of the cut stubble in the predetermined area.

10. The control system of claim 9, wherein the output signal is at least one of:

(a) an adjustment signal configured for adjusting a roll gap of the mower-conditioner;

(b) a plant population signal; or (c) a plant population map signal corresponding to a plant population map generated by the controller system based at least in part on the cut stubble characteristic.

11. The control system of claim 10, wherein the agricultural machine system is a smartphone including a handheld device.

12. The agricultural machine system of claim 7, wherein the controller system includes an Artificial Intelligence model that is configured for (i) distinguishing between different types of plant material and (ii) indicating percentages of each type of plant material within the predetermined area.

13. The agricultural machine system of claim 12, wherein the controller system is further configured to output a plant population map based on the percentages of each type of plant material within the predetermined area.

14. The agricultural machine system of claim 7, wherein the agricultural machine is a mower-conditioner, and the change in operation of the agricultural machine includes adjusting a roll gap of the mower-conditioner based on the output signal.

15. A method of using an agricultural machine system, the method comprising the steps of:

providing the agricultural machine system, wherein the agricultural machine system includes an agricultural machine and a control system operatively coupled with the agricultural machine;

sensing, by a sensor of the control system, a cut stubble of a plant material;

outputting, by the sensor, a cut stubble signal corresponding to the cut stubble;

receiving, by a controller system operatively coupled with the sensor, the cut stubble signal;

determining, by the controller system, a cut stubble characteristic based at least in part on the cut stubble signal, wherein the cut stubble characteristic corresponds to a size of a stem of the cut stubble in a predetermined area, a number of the stem in the predetermined area, and an orientation of the cut stubble; and outputting, by the controller system, an output signal to cause a change in operation of the agricultural machine, wherein the output signal is based at least in part on the cut stubble characteristic.

16. The method of claim 15, wherein the agricultural machine includes a mower, a mower-conditioner, a tedder, a rake, a merger, a baler, or a planter.

17. The method of claim 16, wherein the cut stubble characteristic further corresponds to a number of crowns of the cut stubble in the predetermined area.

18. The method of claim 17, wherein the output signal is at least one of:

(a) an adjustment signal configured for adjusting a roll gap of the mower-conditioner;

(b) a plant population signal; or

(c) a plant population map signal corresponding to a plant population map generated by the controller system based at least in part on the cut stubble characteristic.

19. The method of claim 18, wherein the agricultural machine system is a smartphone including a handheld device.

20. The method of using an agricultural machine system of claim 15, wherein the agricultural machine is a mower-conditioner, and the change in operation of the agricultural machine includes adjusting a roll gap of the mower-conditioner based on the output signal.

\* \* \* \* \*